United States Patent
Higuchi et al.

(10) Patent No.: US 8,739,753 B2
(45) Date of Patent: Jun. 3, 2014

(54) OIL RING AND PISTON FOR AN INTERNAL COMBUSTION ENGINE

(75) Inventors: Tsuyoshi Higuchi, Yokohama (JP); Yutaka Mabuchi, Yokohama (JP); Makoto Yoshida, Hadano (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 317 days.

(21) Appl. No.: 13/000,453

(22) PCT Filed: Jun. 15, 2009

(86) PCT No.: PCT/JP2009/060830
§ 371 (c)(1),
(2), (4) Date: Dec. 21, 2010

(87) PCT Pub. No.: WO2009/157328
PCT Pub. Date: Dec. 30, 2009

(65) Prior Publication Data
US 2011/0100318 A1    May 5, 2011

(30) Foreign Application Priority Data

Jun. 23, 2008 (JP) .................................. 2008-163227
Mar. 26, 2009 (JP) .................................. 2009-075849

(51) Int. Cl.
*F02F 3/00* (2006.01)
*F01M 9/10* (2006.01)

(52) U.S. Cl.
USPC .................................. 123/193.6; 123/196 R (58) Field of Classification Search
USPC ........................................... 123/193.6, 196 R
See application file for complete search history.

(56) References Cited

U.S. PATENT DOCUMENTS

| | | | |
|---|---|---|---|
| 4,344,634 A * | 8/1982 | Onozaki | 277/444 |
| 4,612,260 A | 9/1986 | Kumagai et al. | |
| 7,406,940 B2 * | 8/2008 | Nishimura et al. | 123/193.6 |
| 2001/0009319 A1 * | 7/2001 | Ishida | 277/437 |
| 2005/0005892 A1 | 1/2005 | Nishimura et al. | |
| 2006/0048865 A1 * | 3/2006 | Fujita et al. | 148/332 |
| 2006/0081126 A1 * | 4/2006 | Yamada et al. | 92/248 |
| 2009/0026712 A1 | 1/2009 | Kawanishi et al. | |

FOREIGN PATENT DOCUMENTS

| | | |
|---|---|---|
| CN | 1573177 A | 2/2005 |
| JP | 3-144170 A | 6/1991 |
| JP | 2004-137535 A | 5/2004 |
| JP | 2006-275269 A | 10/2006 |
| JP | 2007-232026 A | 9/2007 |

* cited by examiner

*Primary Examiner* — Lindsay Low
*Assistant Examiner* — Syed O Hasan
(74) *Attorney, Agent, or Firm* — Foley & Lardner LLP (57) ABSTRACT

An oil ring Ro for an internal combustion engine according to the present invention includes at least one selected from the group consisting of hard carbon, CrN and TiN that covers an outer periphery 1 of the oil ring. A radius of curvature R at an outermost portion T of the oil ring in a sliding direction is 0.3 mm or more.

12 Claims, 3 Drawing Sheets

OIL RING AND PISTON FOR AN INTERNAL COMBUSTION ENGINE

TECHNICAL FIELD

The present invention relates to a piston ring attached around a piston for an internal combustion engine such as a vehicular engine, and particularly, relates to an oil ring disposed to scrape lubricating oil so as to prevent the oil from entering a combustion chamber. Further, the present invention relates to a piston provided with the oil ring and a compression ring.

BACKGROUND ART

Reducing mechanical loss in an internal combustion engine such as a vehicular engine is effective to improve fuel consumption. Thus, attempts to reduce frictional losses are being developed with respect to various components.

For example, friction loss in the movement range between a piston and a cylinder bore in an internal combustion engine is considered to account for 20 to 30% of mechanical loss in the entire internal combustion engine. In order to reduce friction especially between a piston ring and a cylinder bore, various suggestions to reduce piston ring tension have been proposed.

Piston ring tension has a close relationship with a sealing property in a combustion chamber, and has an influence on engine oil consumption. In view of this, in addition to simply reducing piston ring tension, a means of providing a surface treatment on a piston ring having a small fluctuation of piston ring tension having a rigid thin coating such as CrN and excellent abrasion resistance, and a means of reducing surface roughness of a piston ring (refer to Patent Document 1) have been proposed.

CITATION LIST

Patent Literature

Patent Document 1: Japanese Patent Unexamined Publication No. 2006-275269

SUMMARY OF INVENTION

Technical Problem

As for the surface treatment on an outer periphery of the piston ring, Cr plating is commonly used. Similarly, a treatment using a rigid thin coating, such as CrN, that has excellent abrasion resistance as described above is conventionally used in addition to a process of reducing piston ring tension.

However, the thin coating, such as CrN, is used only as a substitute for Cr plating in the conventional surface treatment. There is little change in a piston ring configuration to improve abrasion resistance. Although a frictional force between the piston ring and the cylinder bore is reduced as initial tension of the piston ring is reduced, the inventors confirmed that no further effect could be expected due to their analyses.

In general, abrasion on an outer periphery of a piston ring occurs due to a sliding action of the outer periphery of the piston ring and a cylinder bore. As an outermost portion of the piston ring is abraded away, a convex configuration of the piston ring in cross-section is gradually flattened.

On the other hand, when a surface treatment with a rigid coating, such as a CrN coating having high hardness and excellent abrasion resistance, is provided on a piston ring, a rate of abrasion of the piston ring is greatly decreased. Thus, the outermost configuration of the piston ring is maintained in an initial state without being flattened during general usage.

In particular, when using an oil ring (oil scraping ring, oil control ring), a contact width of the oil ring is reduced compared to a compression ring (pressure ring) in order to improve oil scraping performance. Since such an oil ring is easily abraded, the surface treatment with a rigid coating as described above has great significance for the oil ring.

In view of not only an oil scraping function but also a frictional force reduction, the convex configuration of the outer periphery of the oil ring is preferably maintained since the convex configuration reduces the contact width between the oil ring and a surface of the cylinder bore. Accordingly, oil viscosity resistance during sliding is decreased. Thus, the convex configuration is considered to be desirable compared with the case where the oil ring is flattened due to abrasion.

However, as a result of the inventors' analyses by actually using an engine, it was verified that the conventional assumption, in which the sharper the convex outermost configuration of the oil ring is, the more the frictional force is reduced, is not always true.

The above conventional assumption is acceptable only with regard to the oil ring alone. However, the greater the oil scraping capability of the oil ring, the less the amount of oil supply to the compression ring. This reduction of oil supply adversely affects an oil film provided between a compression ring and a cylinder bore.

Conventional tests for investigating an influence of a configuration of an outer periphery of the oil ring are motoring tests or pseudo tests using test pieces corresponding to ring bores. It has been reported that theoretical predictions of those tests are consistent with the results thereof.

On the other hand, it has been reported that an actual thickness of the oil film between the compression ring of a piston and the cylinder bore is much thinner than a thickness calculated geometrically when an engine is in a combustion state. Namely, the amount of oil supply in the conventional tests is too much unlike in the case of the actual engine. Therefore, the conventional tests may not reflect influence on the compression ring precisely.

In order to reduce friction between the piston and cylinder bore, it is considered necessary that not only friction of the oil ring but also friction of the compression ring should be reduced concurrently.

The present invention has been devised in view of such conventional issues. It is an object of the present invention to provide an oil ring for an internal combustion engine in which not only friction of the oil ring itself but also friction between the compression ring and cylinder bore can be reduced.

It is another object of the present invention to provide a piston for an internal combustion engine including the oil ring together with the compression ring as piston rings to reduce a frictional force between the piston ring and the cylinder bore.

Solution to Problem

As a result of the inventors' repeated analyses and experiments on materials and configurations of the oil ring to solve the above issues, it was concluded that an outermost portion of the oil ring preferably has a configuration sufficient to supply a certain amount of oil to the compression ring without necessarily having a convex configuration. Namely, this is a conclusion opposite to the conventional assumption.

The present invention is based on the above-mentioned findings. An oil ring for an internal combustion engine according to the present invention has an outer peripheral surface covered with at least one material selected from the group consisting of hard carbon, CrN and TiN. A radius of curvature R at an outermost portion of the oil ring in a sliding direction is 0.3 mm or more.

In addition, a piston for an internal combustion engine according to the present invention includes at least one oil ring and one compression ring.

Advantageous Effects of Invention

According to the present invention, the outer peripheral surface of the oil ring for an internal combustion engine is covered with at least one of hard carbon, CrN and TiN, and the radius of curvature R at the outermost portion of the oil ring in a sliding direction is 0.3 mm or more. Accordingly, lubricating oil is adequately applied to a sliding surface of the compression ring, and a frictional force between the piston for an internal combustion engine and the cylinder bore is reduced.

DESCRIPTION OF EMBODIMENTS

The following are descriptions of an oil ring and a piston for an internal combustion engine according to the present invention with functions of specific features and reasons for respective numerical limitations.

A piston for an internal combustion engine of the present invention is provided with at least two piston rings, i.e., a compression ring and an oil ring. The present invention was achieved based on a finding that a frictional force between a piston ring and a cylinder bore is significantly reduced due to a tip curvature radius R of an outer periphery of the oil ring being 0.3 mm or more.

Namely, due to the tip curvature radius R of the outer peripheral surface of the oil ring being 0.3 mm or more, lubricating oil is adequately left on a cylinder bore surface without being completely scraped by the oil ring. Accordingly, friction between the cylinder bore surface and the compression ring is reduced, and thus a frictional force of the entire piston is reduced.

If the radius of curvature R is less than 0.3 mm, lubricating oil remaining on the cylinder bore surface is too little to reduce the frictional force of the piston sufficiently.

The frictional force of the entire piston is not increased even if the radius of curvature R is larger. However, if the radius of curvature R is excessively large, contact resistance of the oil ring to a bore surface increases. As a result, the oil ring may not function adequately. Consequently, the radius of curvature R is preferably 6 mm or less, more preferably 3 mm or less.

Figure 1A:
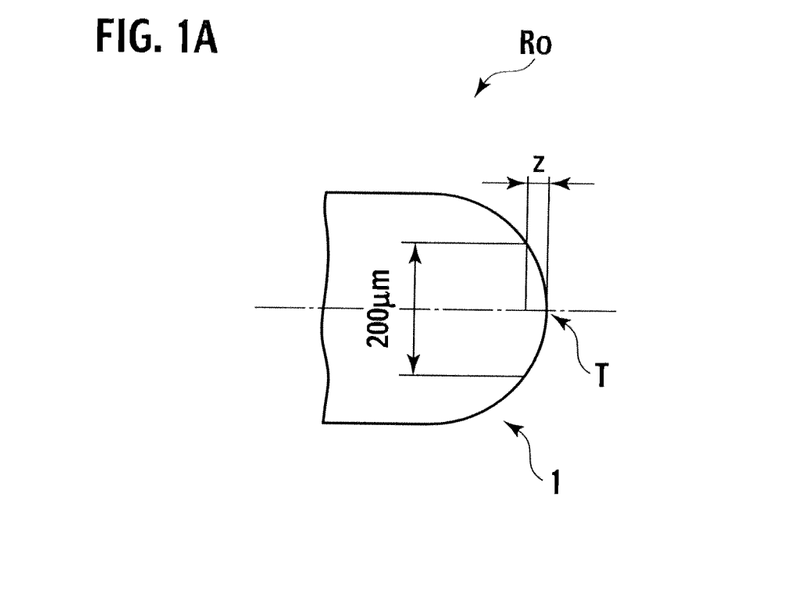
FIG. 1A is a cross-sectional view showing a configuration example of an oil ring for an internal combustion engine according to the present invention.

In the present invention, the "radius of curvature R" represents an average radius of curvature obtained by using the following formula (1). As shown in FIG. 1A showing a vertical cross-section of an outer periphery of an oil ring Ro, a radial difference Z of formula (1) is measured within a width of 200 μm in a sliding direction (thickness direction) centered on a maximum outer diameter point T.

$$R = Z/2 + (2 \times 10^4)/4Z \text{ (unit: μm)} \tag{1}$$

An outer peripheral surface 1 of the oil ring Ro is covered with hard carbon, CrN or TiN, Therefore, a configuration change of the oil ring Ro due to friction can be significantly suppressed, which avoids an outermost configuration of the oil ring Ro being flattened. Accordingly, a frictional force between a cylinder bore surface and a compression ring Re (refer to FIG. 2) can be reduced for a long period of time. As for the hard carbon coating, diamond-like carbon (hereinafter referred to as DLC) is preferably used.

The tip curvature radius R of the outer periphery of the oil ring Ro is 6 mm or less, preferably 3 mm or less in the present invention. Accordingly, a frictional force between the oil ring Ro and the cylinder bore is much further reduced.

In other words, the tip curvature radius R of the outer peripheral surface 1 of the oil ring Ro is between 0.3 mm or more and 6 mm or less, more preferably, between 0.3 mm or more and 3 mm or less. As a result, lubricating oil is adequately left on the cylinder bore surface without being completely scraped by the oil ring. Thus, a frictional force of an entire piston P (refer to FIG. 3) can be reduced.

A hardness of the outer peripheral surface 1 of the oil ring Ro is 2000 Hv or more. Therefore, a configuration change of the oil ring Ro due to friction can be significantly suppressed, which avoids the outermost configuration of the oil ring Ro being flattened. Accordingly, a frictional force between the cylinder bore surface and the compression ring Re can be reduced for a long period of time.

If the hardness of the outer peripheral surface 1 of the oil ring Ro is less than 2000 Hv, abrasion of the outer periphery of the oil ring Ro is increased in proportion to a travel distance of a vehicle even though an initial configuration of the outer periphery of the oil ring Ro is flattened to have the radius of curvature R of 0.3 mm or more. As a result, a frictional force is increased because the oil ring Ro is further flattened, which may increase oil consumption.

A surface roughness of the outer peripheral surface 1 of the oil ring Ro is preferably 0.1 μm or less as a center line average roughness Ra, in view of certainty of an effect to reduce a frictional force.

In order to ensure a hardness sufficient to improve abrasion resistance, have an excellent sliding property, and reduce friction significantly, the outer peripheral surface 1 of the oil ring Ro is preferably covered with a DLC coating as the hard carbon coating. This DLC coating can be formed by a plasma CVD method, for example.

In this case, if hydrogen content in the DLC coating increases, a hardness of the coating decreases, and a friction coefficient tends to increase. Thus, the hydrogen content in the DLC coating is preferably 10 at % or less. In order to further improve the coating hardness, and decrease the friction coefficient in the lubricating oil to ensure a more stable sliding action, the hydrogen content in the DLC coating is preferably 5 at % or less, more preferably 1 at % or less.

Such a DLC coating with low hydrogen content can be manufactured by a physical vapor deposition (PVD) method such as a sputtering method and an ion plating method, namely a method without substantially using hydrogen and hydrogen-containing compounds. In order to reduce the hydrogen content in the coating, the coating is preferably formed not only by using gas not containing hydrogen, but also by sufficiently baking a reaction container and a retainer for holding a substrate of the oil ring and cleaning a surface of the substrate as necessary.

When the outer peripheral surface 1 of the oil ring Ro is covered with a hard coating, the surface roughness of the outer peripheral surface 1 approximately depends on a roughness of a coating formation surface of the substrate. Thus, in order that the surface roughness Ra of the outer peripheral surface 1 of the oil ring Ro is 0.1 μm or less, a surface of the substrate is also required to finally have a surface roughness of 0.1 μm or less.

The oil ring Ro according to the present invention has been described. With regard to the piston P for an internal combustion engine of the present invention, a hardness and a roughness of an outer peripheral surface 2 of the compression ring Rc (refer to FIG. 2) used together with the oil ring Ro are also preferably 2000 Hv or more and 0.1 μm or less, respectively, in view of abrasion resistance and friction property. In addition, the outer peripheral surface 2 of the compression ring Rc also preferably includes a diamond-like carbon (DLC) coating, and a hydrogen content contained in DLC is preferably 10 at %.

EXAMPLES

The following are further descriptions of the present invention based on examples and comparative examples. However, the present invention is not limited to those examples.

[Manufacture of Oil Ring Ro]

A carbon steel material SWRH72 standardized by Japan Industrial Standard JIS G 3506 (High carbon steel wire rods) was subjected to a cold-drawn treatment, followed by quenching and tempering treatments. A plurality of wire rods were formed, in which one surface with a 0.4 mm width of a rectangular cross-section of 0.4 mm×2.0 mm of each wire rod was processed to have a radius of curvature R (0.2 to 2 mm). Then, the wire rods were formed in a ring shape having an outer diameter (nominal size) of 93 mm, followed by cutting an abutment.

Next, a heat treatment for removing distortion was performed on the ring-like wire rods, and each outer periphery thereof was polished. Then, each outer periphery was coated with a CrN coating or a DLC coating by an ion plating method. A hydrogen content of the DLC coating was adjusted by changing a hydrogen concentration in a raw material.

Figure 1B:
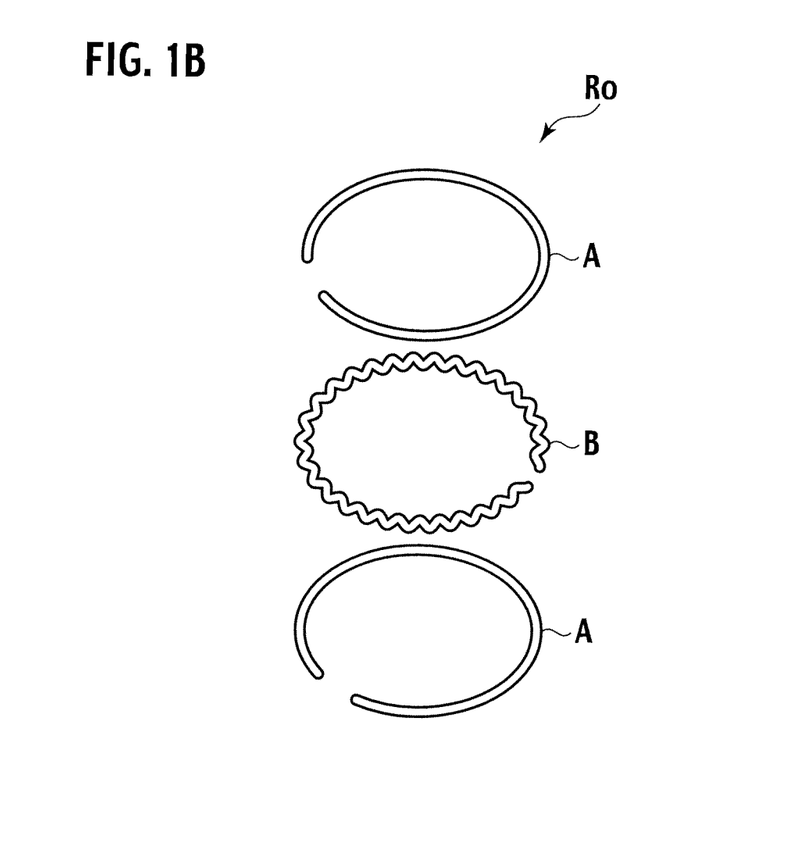
FIG. 1B is an assembly illustration showing a configuration example of an oil ring for an internal combustion engine according to the present invention.

As shown in FIG. 1B, a spacer B composed of SUS304 was interposed between two side rails A formed by the above-described procedure, so as to manufacture an oil ring Ro with a tension of 20N at an insertion into the cylinder liner.

[Manufacture of Compression Ring Re]

A Cr—V system heat-resistant spring material SWOSC-V standardized by JIS G 3561 (Oil tempered wire for valve spring) was subjected to a cold-drawn treatment, followed by quenching and tempering treatments. Wire rods having a rectangular cross-section of 1.2 mm×2.5 mm were thus obtained.

Figure 2:
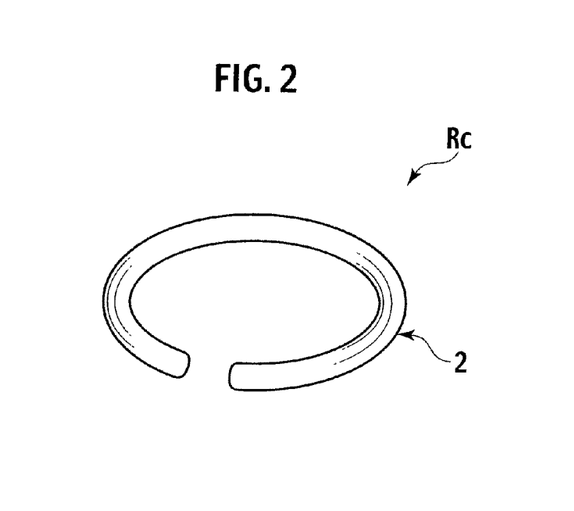
FIG. 2 is a perspective view showing a configuration example of a compression ring used in a piston for an internal combustion engine according to the present invention.

Each wire rod was formed in a ring shape to have tension of 10N at the insertion into the cylinder liner having an inner diameter of 93 mm, followed by cutting an abutment, so as to manufacture a compression ring Rc as shown in FIG. 2. An outer periphery 2 of the compression ring Rc was coated with a CrN coating or a DLC coating by the similar method used in the oil ring Ro.

[Manufacture of Second Compression Ring Re]

Gray cast iron was processed to have a cross-section of 1.5 mm×2.5 mm by cutting. The gray cast iron was formed in a ring shape to have a tension of 1 ON at the insertion into the cylinder liner having an inner diameter of 93 mm, followed by cutting an abutment.

[Sliding Test]

Figure 3:
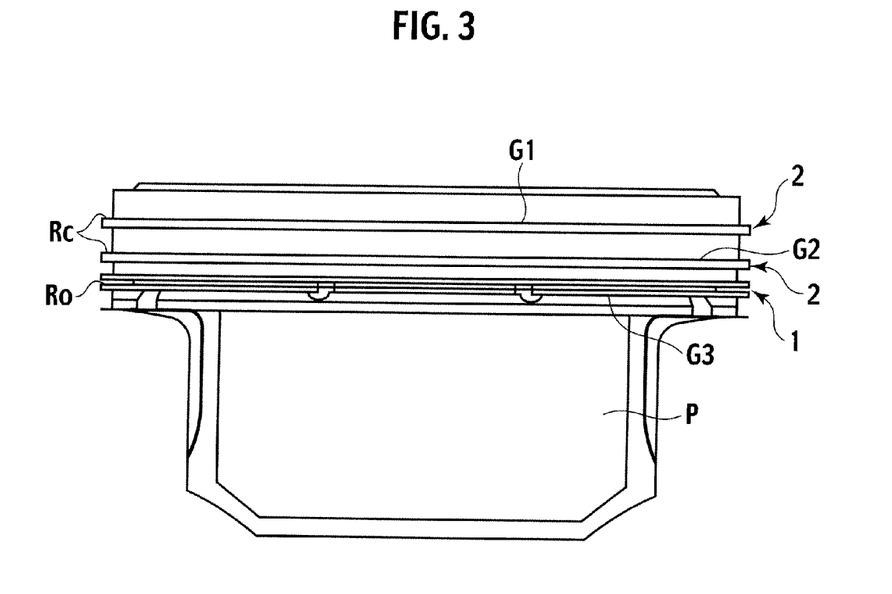
FIG. 3 is a side view showing a location example of a compression ring and an oil ring on a piston for an internal combustion engine according to the present invention.

As shown in FIG. 3, a piston P was prepared as a piston for a vehicular engine, a VQ30DE engine manufactured by NISSAN MOTOR CO. LTD. The two compression rings Re manufactured by the above-described procedure were placed in a ring groove G1 and a ring groove G2 as a top ring and a second ring, respectively. One of the oil rings Ro manufactured by the above-described procedure was placed in a ring groove G3 below the ring groove G1 and the ring groove G2. The piston P provided with those rings was subjected to a sliding test in a cylinder bore using a friction and abrasion testing machine.

The friction and abrasion testing machine has a mechanism in which a load cell attached to the piston detects a frictional force generated between the piston and the cylinder bore by vibrating the cylinder bore hydraulically. An average frictional force of each example was measured by applying 700 vibrations per minute during the test, by use of commercially available engine oil having a viscosity grade of 5W30.

The test results are listed in Table 1 together with each combination of specifications of the compression ring Rc and the oil ring Ro.

TABLE 1

| | Oil Ring Ro | | | | | Compression Ring Rc | | | | Average |
|---|---|---|---|---|---|---|---|---|---|---|
| | Curvature Radius | Surface Coating | | | | Surface Coating | | | | |
| Section | R of Outer Peripheral surface (mm) | Type | Hardness (Hv) | Surface Roughness Ra (μm) | Hydrogen Content (at %) | Type | Hardness (Hv) | Surface Roughness Ra (μm) | Hydrogen Content (at %) | Friction Force (N) |
| Comparative Example 1 | 0.2 | CrN | 2000 | 0.15 | | CrN | 2000 | 0.15 | | 35 |
| Comparative Example 2 | 0.25 | CrN | 2000 | 0.15 | | CrN | 2000 | 0.15 | | 37 |
| Comparative Example 3 | 0.25 | CrN | 2000 | 0.05 | | CrN | 2000 | 0.15 | | 36 |
| Example 1 | 0.3 | CrN | 2000 | 0.15 | | CrN | 2000 | 0.15 | | 30 |
| Example 2 | 0.5 | CrN | 2000 | 0.15 | | CrN | 2000 | 0.15 | | 24 |
| Example 3 | 2 | CrN | 2000 | 0.15 | | CrN | 2000 | 0.15 | | 28 |

TABLE 1-continued

| | | Oil Ring Ro | | | | Compression Ring Rc | | | | Average |
| | Curvature Radius | Surface Coating | | | | Surface Coating | | | | |
| Section | R of Outer Peripheral surface (mm) | Type | Hardness (Hv) | Surface Roughness Ra (μm) | Hydrogen Content (at %) | Type | Hardness (Hv) | Surface Roughness Ra (μm) | Hydrogen Content (at %) | Friction Force (N) |
|---|---|---|---|---|---|---|---|---|---|---|
| Example 4 | 0.5 | CrN | 2000 | 0.1 | | CrN | 2000 | 0.1 | | 23 |
| Example 5 | 0.5 | CrN | 2000 | 0.05 | | CrN | 2000 | 0.05 | | 23 |
| Example 6 | 0.5 | CrN | 2000 | 0.05 | | CrN | 2000 | 0.05 | | 22 |
| Example 7 | 0.5 | DLC | 3000 | 0.05 | 15 | CrN | 2000 | 0.05 | | 22 |
| Example 8 | 0.5 | CrN | 2000 | 0.05 | | DLC | 7000 | 0.05 | 0.5 | 19 |
| Example 9 | 0.5 | DLC | 4000 | 0.05 | 10 | DLC | 7000 | 0.05 | 0.5 | 19 |
| Example 10 | 0.5 | DLC | 5000 | 0.05 | 5 | DLC | 7000 | 0.05 | 0.5 | 18 |
| Example 11 | 0.5 | DLC | 7000 | 0.05 | 0.5 | DLC | 7000 | 0.05 | 0.5 | 17 |
| Example 12 | 0.5 | CrN | 2000 | 0.1 | | CrN | 2000 | 0.15 | | 24 |
| Example 13 | 0.5 | DLC | 5000 | 0.05 | 5 | CrN | 2000 | 0.15 | | 21 |
| Example 14 | 0.5 | DLC | 7000 | 0.05 | 0.5 | CrN | 2000 | 0.15 | | 20 |
| Example 15 | 1.4 | CrN | 2000 | 0.15 | | CrN | 2000 | 0.15 | | 26 |
| Example 16 | 6 | CrN | 2000 | 0.15 | | CrN | 2000 | 0.15 | | 31 |

Comparative Example 1

Two compression rings Rc and an oil ring Ro were used together. The compression rings were covered on each outer peripheral surface with a CrN coating having a Vickers hardness of 2000 Hv, and had a surface roughness Ra of 0.15 μm. The oil ring Ro had a barrel aced outer peripheral surface of which an average tip curvature radius R was 0.2 mm in a width of 200 pin in a sliding direction, and was covered with a CrN coating having a Vickers hardness of 2000 Hv and a surface roughness Ra of 0.15 μm identical to the compression rings Re. An average frictional force between the piston P and the cylinder bore in this example was 35 N.

Comparative Example 2

Two compression rings Re identical to Comparative Example 1 and an oil ring Ro were used together, in which a surface of the oil ring Ro was processed similarly to Comparative Example 1 and had an average tip curvature radius R of an outer peripheral surface being 0.25 mm. An average frictional force between the piston P and the cylinder bore in this example was 37 N, which was slightly increased compared to 35 N in Comparative Example 1.

Comparative Example 3

Two compression rings Rc identical to Comparative Example 1 and an oil ring Ro were used together, in which the oil ring Ro was covered with a CrN coating having a surface hardness of 2000 Hv and a surface roughness Ra of 0.05% n, and had an average tip curvature radius R of an outer peripheral surface being 0.25 mm. By using the piston P, the cylinder bore, and the friction and abrasion testing machine identical to Comparative Example 1, an average frictional force between the piston P and the cylinder bore was measured by applying 700 vibrations per minute to the cylinder bore.

As a result, an average frictional force between the piston P and the cylinder bore in this example was 36 N, which was slightly decreased compared to 37 N in Comparative Example 2.

Example 1

Two compression rings Rc identical to Comparative Example 1 and an oil ring Ro were used together, in which a surface of the oil ring Ro was processed similarly to Comparative Example 1 and had an average tip curvature radius R of an outer peripheral surface being 0.3 mm. An average frictional force between the piston P and the cylinder bore in this example was 30 N. Example 1 proved that the average frictional force in this example was decreased compared to 35 N, 37 N and 36 N of respective Comparative Examples 1, 2 and 3.

Example 2

Two compression rings Rc identical to Comparative Example 1 and an oil ring Ro were used together, in which a surface of the oil ring Ro was processed similarly to Comparative Example 1 and had an average tip curvature radius R of an outer peripheral surface being 0.5 mm. An average frictional force between the piston P and the cylinder bore in this example was 24 N. Example 2 proved that the average frictional force in this example was further decreased compared to 30 N in Example 1.

Example 3

Two compression rings Rc identical to Comparative Example 1 and an oil ring Ro were used together, in which a surface of the oil ring Ro was processed similarly to Comparative Example 1 and had an average tip curvature radius R of an outer peripheral surface being 2 mm. An average frictional force between the piston P and the cylinder bore in this example was 28 N, which was decreased compared to 35 N, 37 N and 36 N of respective Comparative Examples 1, 2 and 3. However, the average frictional force in this example was increased compared to 24 N in Example 2.

Example 4

Two compression rings Rc identical to Comparative Example 1 except for a surface roughness Ra of 0.1 μm and an oil ring Ro were used together. The oil ring Ro had a barrel-faced outer peripheral surface of which an average tip curvature radius R was 0.5 mm in a width of 200 μm in a sliding direction, and was covered with a CrN coating having a Vickers hardness of 2000 Hv and a surface roughness Ra of 0.1 μm identical to the compression rings Re. An average frictional force between the piston P and the cylinder bore in this example was 23 N. Example 4 proved that the average frictional force in this example was slightly decreased compared to 24 N in Example 2.

Example 5

Two compression rings Rc identical to Comparative Example 1 except for a surface roughness Ra of 0.05 μm and an oil ring Ro were used together. The oil ring Ro had a barrel-faced outer peripheral surface of which an average tip curvature radius R was 0.5 mm in a width of 200 μm in a sliding direction, and was covered with a CrN coating having a Vickers hardness of 2000 Hv and a surface roughness Ra of 0.05 μm identical to the compression rings Re. An average frictional force between the piston P and the cylinder bore in this example was 23 N. Example 5 proved that the average frictional force in this example was slightly decreased compared to 24 N in Example 2. Moreover, the average frictional force in this example was significantly decreased compared to 36 N in Comparative Example 3, in which the oil ring Ro had the same surface roughness as this example.

Example 6

Two compression rings Re identical to Comparative Example 1 except for a surface roughness Ra of 0.05 μm and an oil ring Ro were used together. The oil ring Ro had a barrel-faced outer peripheral surface of which an average tip curvature radius R was 0.5 mm in a width of 200 μm in a sliding direction, and was covered with a CrN coating having a Vickers hardness of 2000 Hv and a surface roughness Ra of 0.05 in identical to the compression rings Rc. An average frictional force between the piston P and the cylinder bore in this example was 22 N. Example 6 proved that the average frictional force in this example was further decreased compared to 23 N in Example 5.

Example 7

Two compression rings Re identical to Comparative Example 1 except for a surface roughness Ra of 0.05 μm and an oil ring Ro were used together. The oil ring Ro had a barrel-faced outer peripheral surface of which an average tip curvature radius R was 0.5 mm in a width of 200 μm in a sliding direction, and was covered with a DLC coating (hydrogen content: 15 at %) having a Vickers hardness of 3000 Hv and a surface roughness Ra of 0.05 μm. An average frictional force between the piston P and the cylinder bore in this example was 22 N. Example 7 proved that the average frictional force in this example was further decreased compared to 23 N in Example 5.

Example 8

Two compression rings Rc and an oil ring Ro were used together. The compression rings were covered on each outer peripheral surface with a DLC coating (hydrogen content: 0.5 at %) having a Vickers hardness of 7000 Hv, and had a surface roughness Ra of 0.05 μm. The oil ring Ro had a barrel-faced outer peripheral surface of which an average tip curvature radius R was 0.5 mm in a width of 200 μm in a sliding direction, and was covered with a CrN coating having a Vickers hardness of 2000 Hv and a surface roughness Ra of 0.05 μm. An average frictional force between the piston P and the cylinder bore in this example was 19 N, which was further decreased compared to 22 N in Example 6 and 22 N in Example

Example 9

Two compression rings Rc and an oil ring Ro were used together. The compression rings were covered on each outer peripheral surface with a DLC coating (hydrogen content: 0.5 at %) having a Vickers hardness of 7000 Hv, and had a surface roughness Ra of 0.05 μm. The oil ring Ro had a barrel-faced outer peripheral surface of which an average tip curvature radius R was 0.5 mm in a width of 200 μm in a sliding direction, and was covered with a DLC coating (hydrogen content: 10 at %) having a Vickers hardness of 4000 Hv and a surface roughness Ra of 0.05 μm. An average frictional force between the piston P and the cylinder bore in this example was 19 N, which was further decreased compared to 22 N in Example 6 and 22 N in Example 7.

Example 10

Two compression rings Rc and an oil ring Ro were used together. The compression rings were covered on each outer peripheral surface with a DLC coating (hydrogen content: 0.5 at %) having a Vickers hardness of 7000 Hv, and had a surface roughness Ra of 0.05 μm. The oil ring Ro had a barrel-faced outer peripheral surface of which an average tip curvature radius R was 0.5 mm in a width of 200 μm in a sliding direction, and was covered with a DLC coating (hydrogen content: 5 at %) having a Vickers hardness of 5000 Hv and a surface roughness Ra of 0.05 μm. An average frictional force between the piston P and the cylinder bore in this example was 18 N, which was further decreased compared to 19 N in Example 9.

Example 11

Two compression rings Rc and an oil ring Ro were used together. The compression rings were covered on each outer peripheral surface with a DLC coating (hydrogen content: 0.5 at %) having a Vickers hardness of 7000 Hv, and had a surface roughness Ra of 0.05 μm. The oil ring Ro had a barrel-faced outer peripheral surface of which an average tip curvature radius R was 0.5 mm in a width of 200 μm in a sliding direction, and was covered with a DLC coating (hydrogen content: 0.5 at %) having a Vickers hardness of 7000 Hv and a surface roughness Ra of 0.05 μm. An average frictional force between the piston P and the cylinder bore in this example was 17 N, which was further decreased compared to 18 N in Example 10.

Example 12

Two compression rings Re and an oil ring Ro were used together. The compression rings were covered on each outer peripheral surface with a CrN coating having a Vickers hardness of 2000 Hv and had a surface roughness Ra of 0.15 μm. The oil ring Ro had a barrel-faced outer peripheral surface of which an average tip curvature radius R was 0.5 mm in a width of 200 μm in a sliding direction, and was covered with a CrN coating having a Vickers hardness of 2000 Hv identical to the compression rings Rc and a surface roughness Ra of 0.1 μm. An average frictional force between the piston P and the cylinder bore in this example was 24 N. Example 12 proved that the average frictional force in this example was decreased compared to 30 N in Example 1.

Example 13

Two compression rings Rc identical to Comparative Example 1 and an oil ring Ro were used together. The oil ring Ro had a barrel-faced outer peripheral surface of which an average tip curvature radius R was 0.5 mm in a width of 200 μm in a sliding direction, and was covered with a DLC coating (hydrogen content: 5 at %) having a Vickers hardness of 5000 Hv and a surface roughness Ra of 0.05 μm. An average frictional force between the piston P and the cylinder bore in this example was 21 N, which was further decreased compared to 24 N in Example 12.

Example 14

Two compression rings Re identical to Comparative Example 1 and an oil ring Ro were used together. The oil ring Ro had a barrel-faced outer peripheral surface of which an average tip curvature radius R was 0.5 mm in a width of 200 μm in a sliding direction, and was covered with a DLC coating (hydrogen content: 0.5 at %) having a Vickers hardness of 7000 Hv and a surface roughness Ra of 0.05 μm. An average frictional force between the piston P and the cylinder bore in this example was 20 N. Example 14 proved that the average frictional force in this example was further decreased compared to 24 N in Example 12 and 21 N in Example 13.

Example 15

Two compression rings Re identical to Comparative Example 1 and an oil ring Ro were used together. The oil ring Ro had a barrel-faced outer peripheral surface of which an average tip curvature radius R was 1.4 mm in a width of 200 μm in a sliding direction, and was covered with a CrN coating having a Vickers hardness of 2000 Hv and a surface roughness Ra of 0.15 μm identical to the compression rings Rc. An average frictional force between the piston P and the cylinder bore in this example was 26 N.

Example 16

Two compression rings Rc identical to Comparative Example 1 and an oil ring Ro were used together. The oil ring Ro had a barrel-faced outer peripheral surface of which an average tip curvature radius R was 6 mm in a width of 200 μm in a sliding direction, and was covered with a CrN coating having a Vickers hardness of 2000 Hv and a surface roughness Ra of 0.15 μm identical to the compression rings Rc. An average frictional force between the piston P and the cylinder bore in this example was 31 N.

Figure 4:
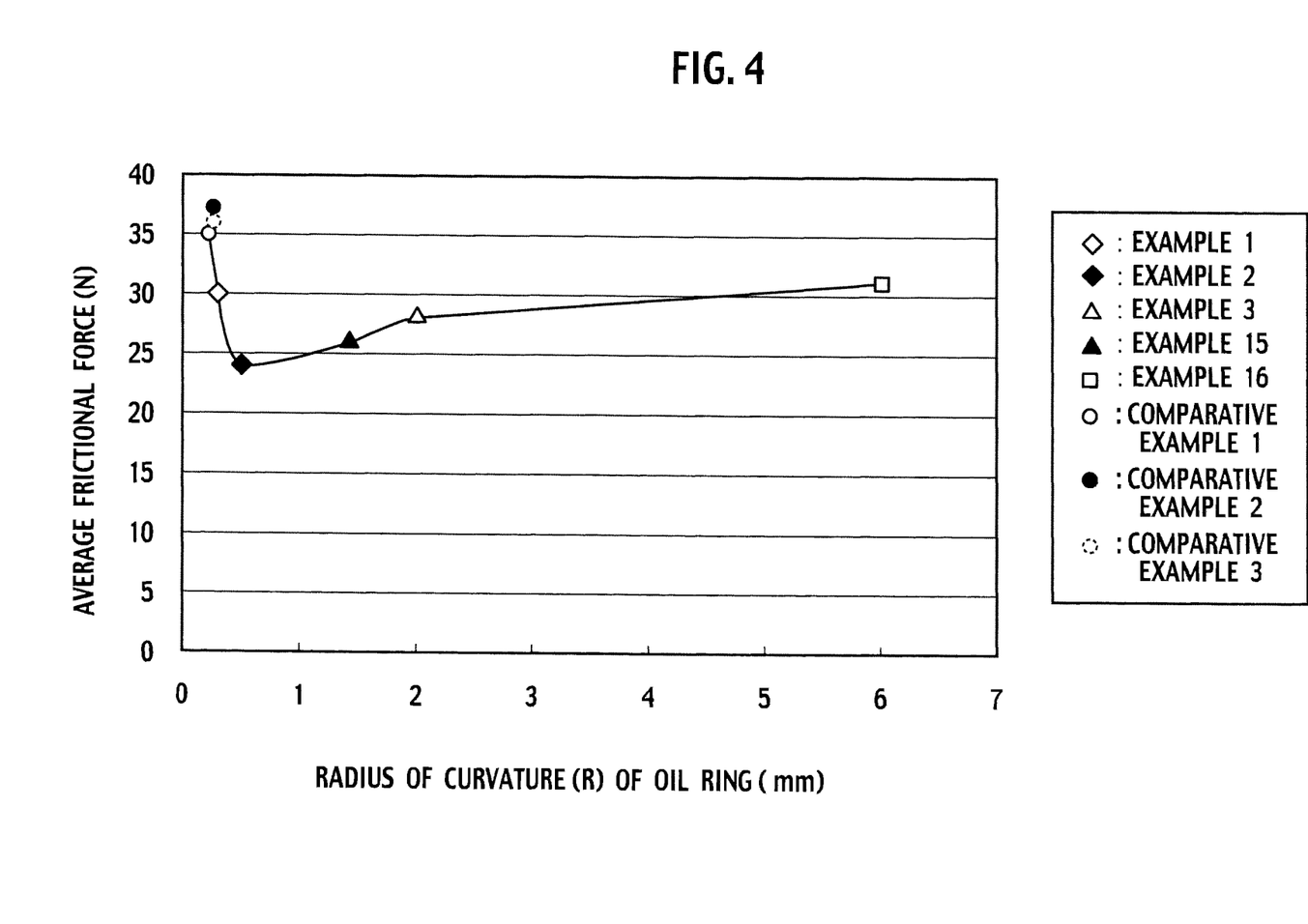
FIG. 4 is a graph showing a relationship between an average frictional force and a radius of curvature of an oil ring based on results of Examples 1 to 3, 15, 16, and Comparative Examples 1 to 3.

FIG. 4 is a graph showing a test result obtained by the sliding tests based on Examples 1 to 3, 15, 16, and Comparative Examples 1 to 3. The graph illustrates influence of the radius of curvature R (mm) of the oil ring Ro exerted on the average frictional force (N).

As clearly shown in FIG. 4, the average frictional force is significantly decreased when the average tip curvature radius R of the outer periphery 1 of the oil ring Ro in a width of 200 μm in a sliding direction is 0.3 mm or more (refer to Example 1). The entire contents of Japanese Patent Application No. P2008-163227 (filed on Jun. 23, 2008), and Japanese Patent Application No. P2009-075849 (filed on Mar. 26, 2009) are herein incorporated by reference, which protect the present application from mistranslations and omissions.

Although the invention has been described referring to the embodiment and examples, the invention is not limited to the foregoing embodiment and examples, and modifications may become apparent to those skilled in the art within the scope of the invention.

INDUSTRIAL APPLICABILITY

According to the present invention, the outer peripheral surface of the oil ring for an internal combustion engine is covered with at least one of hard carbon, CrN and TiN, and the radius of curvature R at the outermost portion of the piston ring in a sliding direction is 0.3 mm or more. Accordingly, lubricating oil is adequately applied to a sliding surface of the compression ring, and a frictional force between the piston for an internal combustion engine and the cylinder bore is reduced.

The invention claimed is:

1. An oil ring for an internal combustion engine having outer peripheral surface covered with at least one material selected from the group consisting of hard carbon, CrN and TiN, the oil ring comprising:
   a first side rail,
   a second side rail, and
   a spacer sandwiched between the first side rail and the second side rail,
   wherein a radius of curvature at an outermost portion of the oil ring in a sliding direction is greater than or equal to 0.3 mm and less than or equal to 2 mm,
   wherein the radius of curvature is obtained when a radial difference is measured within a width of 200 μm in the sliding direction of the oil ring centered on a maximum outer diameter point, the maximum outer diameter point being an outermost portion of the outer peripheral surface,
   wherein the radius of curvature denoted by R is expressed in terms of the radial difference denoted by Z according to the following equation in units of μm: $R=Z/2+(2+10^4)/4Z$.

2. An oil ring for an internal combustion engine having an outer peripheral surface covered with at least one material selected from the group consisting of hard carbon, CrN, and TiN, the oil ring comprising:
   a first side rail,
   a second side rail, and
   a spacer sandwiched between the first side rail and the second side rail,
   wherein a radius of curvature at an outermost portion of the oil ring in a sliding direction is 0.3 mm or more,
   wherein the radius of curvature is obtained when a radial difference is measured within a width of 200 μm in the sliding direction of the oil ring centered on a maximum outer diameter point, the maximum outer diameter point being an outermost portion of the outer peripheral surface,
   wherein the radius of curvature denoted by R is expressed in terms of the radial difference denoted by Z according to the following equation in units of μm: $R=Z/2+(2+10^4)/4Z$.

3. The oil ring for an internal combustion engine according to claim 2, wherein the radius of curvature is 6 mm or less.

4. The oil ring for an internal combustion engine according to claim 2, wherein the radius of curvature is 3 mm or less.

5. The oil ring for an internal combustion engine according to claim 2, wherein a hardness of the outer peripheral surface is 2000 Hv or more.

6. The oil ring for an internal combustion engine according to claim 2, wherein a roughness Ra on the outer peripheral surface is 0.1 μm or less.

7. The oil ring for an internal combustion engine according to claim 2, wherein hard carbon covering the outer peripheral surface is diamond-like carbon, and a hydrogen content in a coating of the diamond-like carbon is 10 at % or less.

8. The oil ring for an internal combustion engine according to claim 7, wherein the hydrogen content in the coating of the diamond-like carbon is 5 at % or less.

9. The oil ring for an internal combustion engine according to claim 8, wherein the hydrogen content in the coating of the diamond-like carbon is 1 at % or less.

10. A piston for an internal combustion engine, comprising:
    at least two piston rings of the oil ring according to claim 2 and a compression ring.

11. The piston for an internal combustion engine according to claim 10, wherein an outer peripheral surface of the compression ring is covered with a coating of diamond-like carbon.

12. The piston for an internal combustion engine according to claim 11, wherein a hydrogen content in the coating of the diamond-like carbon on the outer peripheral surface of the compression ring is 10 at % or less.

* * * * *